US012641467B2

(12) United States Patent
Pan et al.

(10) Patent No.: US 12,641,467 B2
(45) Date of Patent: May 26, 2026

(54) SYSTEMS AND METHODS FOR INDICATING POSITIONING INFORMATION IN WIRELESS COMMUNICATION SYSTEMS

(71) Applicant: ZTE CORPORATION, Guangdong (CN)

(72) Inventors: Yu Pan, Shenzhen (CN); Guozeng Zheng, Shenzhen (CN); Chuangxin Jiang, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 365 days.

(21) Appl. No.: 18/458,962

(22) Filed: Aug. 30, 2023

(65) Prior Publication Data

US 2024/0098544 A1 Mar. 21, 2024

Related U.S. Application Data

(63) Continuation of application No. PCT/CN2021/085295, filed on Apr. 2, 2021.

(51) Int. Cl.
| | |
|---|---|
| *H04W 24/10* | (2009.01) |
| *H04L 5/00* | (2006.01) |
| *H04W 56/00* | (2009.01) |

(52) U.S. Cl.
CPC ........... *H04W 24/10* (2013.01); *H04L 5/0048* (2013.01); *H04W 56/0055* (2013.01)

(58) Field of Classification Search
CPC .. H04W 24/10; H04W 56/0055; H04L 5/0048
See application file for complete search history.

(56) References Cited

U.S. PATENT DOCUMENTS

| | | | |
|---|---|---|---|
| 6,230,018 | B1 | 5/2001 | Watters et al. |
| 9,173,183 | B1 | 10/2015 | Ray et al. |

(Continued)

FOREIGN PATENT DOCUMENTS

| | | |
|---|---|---|
| CN | 101616482 A | 12/2009 |
| CN | 103959731 A | 7/2014 |

(Continued)

OTHER PUBLICATIONS (Moderator) CATT, "FL Summary for Potential Positioning Enhancements," 3GPP TSG RAN WG1 Meeting #102-e, R1-2006972, Jun. 5, 2020, e-meeting (68 pages).

(Continued)

*Primary Examiner* — Deepa Belur
(74) *Attorney, Agent, or Firm* — Foley & Lardner LLP

(57) ABSTRACT

Systems and methods for indicating positioning information in wireless communication systems are disclosed. In one aspect, a method includes receiving, by a wireless communication device from a network, network timing error information; and reporting, by the wireless communication device to the network, downlink measurement results and User Equipment (UE) timing error information, wherein, the network timing error information comprises at least one of Transmission and Reception Point (TRP) transmission Timing Error Group (TEG) information and TRP reception TEG information; the UE timing error information comprises at least one of UE transmission TEG information and UE reception TEG information.

18 Claims, 10 Drawing Sheets

400

Receive network timing error information including at least TRP transmission TEG information and TRP reception TEG reception | 402

Determine UE reception TEG information according to the TRP transmission TEG information | 404

Determine downlink measurement associated with UE reception TEG information having same ID as TRP transmission TEG information, the downlink measurement derived from downlink resources associated with the TRP transmission TEG information | 406

Report downlink measurement results and UE timing error information, the UE timing error information including at least one of UE transmission TEG information and UE reception TEG information. | 408

(56) References Cited

U.S. PATENT DOCUMENTS

| | | | |
|---|---|---|---|
| 2021/0075573 A1 | 3/2021 | Manolakos et al. | |
| 2023/0101737 A1* | 3/2023 | Bao | H04L 5/0048 |
| | | | 455/456.1 |
| 2023/0142084 A1* | 5/2023 | Cha | H04W 56/00 |
| | | | 455/456.1 |
| 2024/0007994 A1* | 1/2024 | Si | H04W 56/005 |
| 2024/0007995 A1* | 1/2024 | Wang | H04L 5/0051 |
| 2024/0098544 A1* | 3/2024 | Pan | G01S 5/0036 |
| 2024/0406914 A1* | 12/2024 | Lee | G01S 5/00 |

FOREIGN PATENT DOCUMENTS

| | | |
|---|---|---|
| CN | 109792632 A | 5/2019 |
| CN | 112188542 A | 1/2021 |
| JP | 2024-514423 A | 4/2024 |
| WO | WO-2020/146820 A1 | 7/2020 |
| WO | WO-2020/146829 A1 | 7/2020 |
| WO | WO-2021/061338 A1 | 4/2021 |
| WO | WO-2022/194203 A1 | 9/2022 |

OTHER PUBLICATIONS

CATT, "Discussion of NR positioning enhancements" 3GPP TSG RAN WG1 Meeting #102; R1-2005712; Aug. 28, 2020, e-Meeting (21 pages).

International Search Report and Written Opinion for PCT Appl. No. PCT/CN2021/085295, mailed Jan. 5, 2022 (8 pages).

CATT, "Summary #2 of UE and gNB measurements for NR Positioning", 3GPP TSG RAN WG1 #99, R1-1912147, Nov. 22, 2019, Reno, Nevada (25 pages).

First Office Action for CN 202180096663.6, dated Aug. 24, 2024 (with English translation, 25 pages).

Moderator (CATT), "FL Summary for accuracy improvements by mitigating UE Rx/Tx and/or gNB Rx/Tx timing delays", 3GPP TSG RAN WG1 Meeting #104-e, R1-2101764, Feb. 5, 2021, e-meeting (34 pages).

Communication pursuant to Article 94(3) EPC for EP Appl. No. 21934080.9, dated Jul. 10, 2025 (5 pages).

Examination Report for IN Appl. No. 202327058055, dated Jul. 31, 2025 (6 pages).

Ericsson, "Techniques mitigating UE Rx/Tx timing delays," 3GPP TSG-RAN WG1 Meeting #104-e; R1-2101754; e-Meeting; Jan. 25-Feb. 5, 2021 (22 pages).

Intel Corporation, et al., "NR Positioning Enhancements," 3GPP TSG RAN meeting #91e; RP-2106247; Electronic Meeting; Mar. 16-26, 2021 (11 pages).

Partial Supplementary European Search Report for EP App. No. 21934080.9 dated Jun. 24, 2024 (18 pages).

Moderator (CATT), FL Summary #4 for accuracy improvements by mitigating UE Rx/Tx and/or gNB Rx/Tx timing delays, 3GPP TSG RAN WG1 Meeting #104-e, R1-2102122, Feb. 5, 2021, e-meeting (14 pages).

Notice of Reasons for Rejection for JP App. No. 2023-552509 dated Jan. 7, 2025 (with English translation, 14 pages).

ZTE, "Positioning accuracy improvement by mitigating timing delay", 3GPP TSG RAN WG1 Meeting #104b-e, R1-2102668, Apr. 20, 2021, e-Meeting (12 pages).

Notice of Re-examination for CN App. No. 202180096663.6, dated Sep. 23, 2025 (with English translation, 18 pages).

* cited by examiner

200

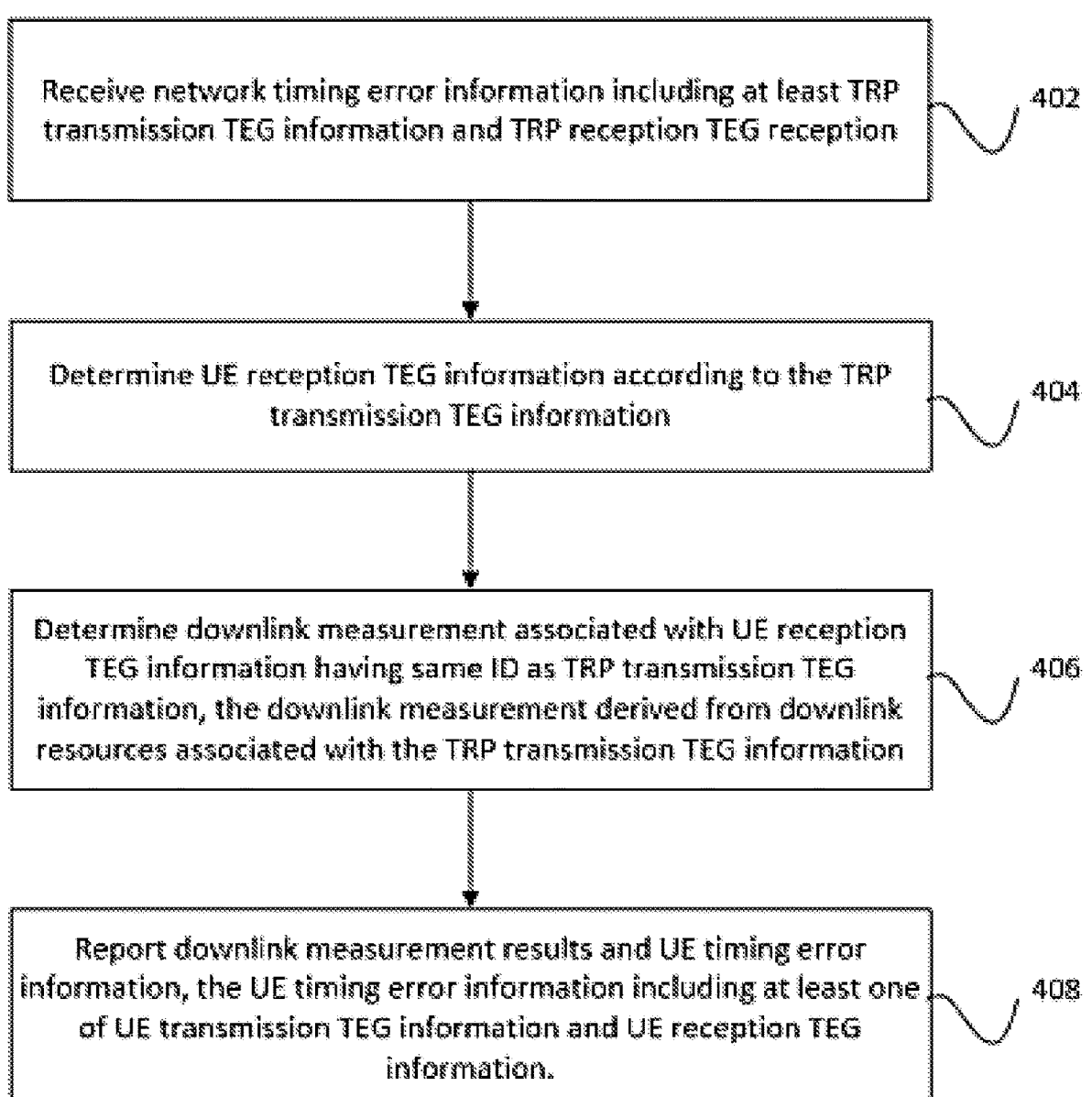

400

Receive network timing error information including at least TRP transmission TEG information and TRP reception TEG reception — 402

Determine UE reception TEG information according to the TRP transmission TEG information — 404

Determine downlink measurement associated with UE reception TEG information having same ID as TRP transmission TEG information, the downlink measurement derived from downlink resources associated with the TRP transmission TEG information — 406

Report downlink measurement results and UE timing error information, the UE timing error information including at least one of UE transmission TEG information and UE reception TEG information. — 408

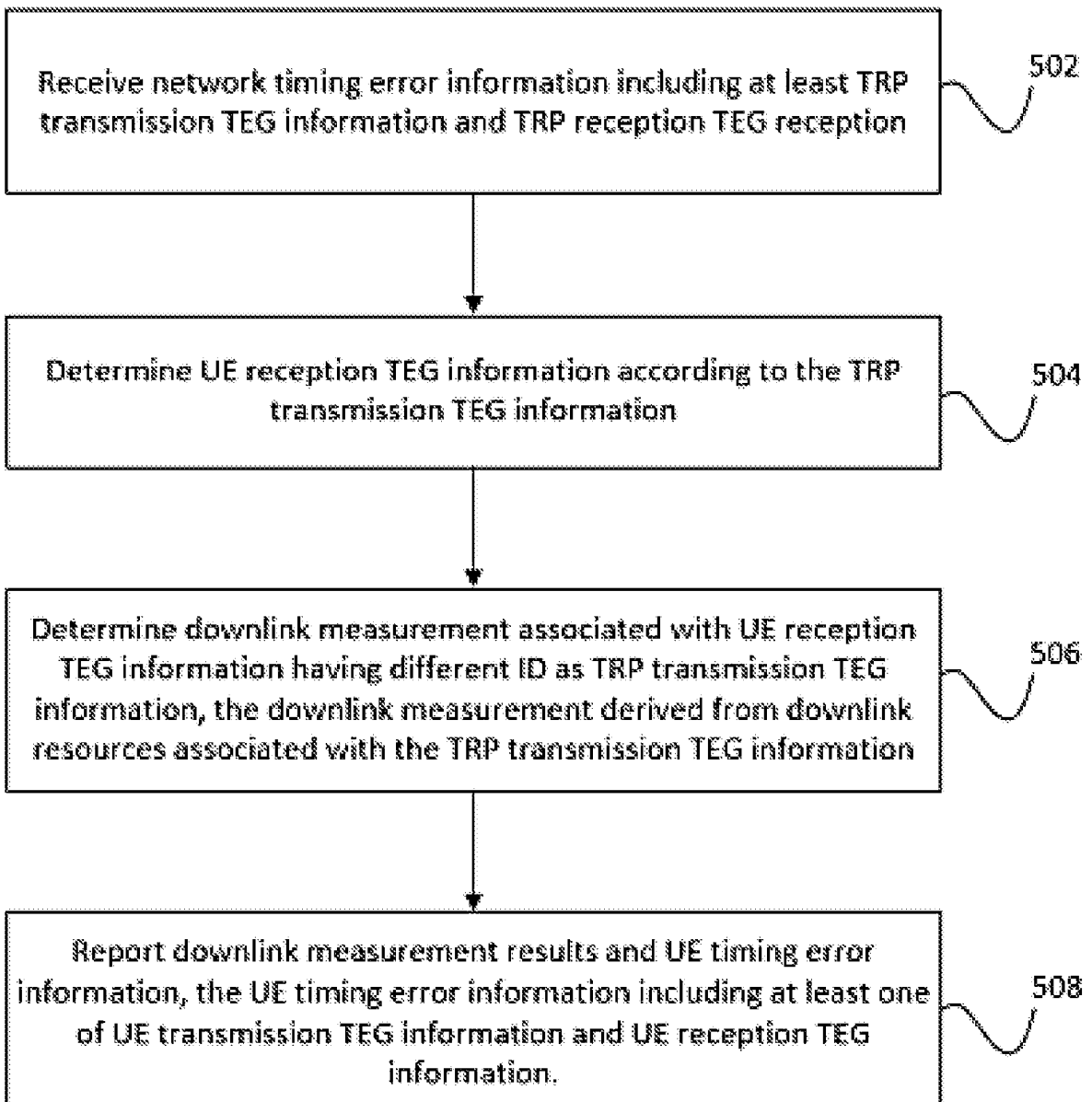

Receive network timing error information including at least TRP transmission TEG information and TRP reception TEG reception          502

Determine UE reception TEG information according to the TRP transmission TEG information          504

Determine downlink measurement associated with UE reception TEG information having different ID as TRP transmission TEG information, the downlink measurement derived from downlink resources associated with the TRP transmission TEG information          506

Report downlink measurement results and UE timing error information, the UE timing error information including at least one of UE transmission TEG information and UE reception TEG information.          508

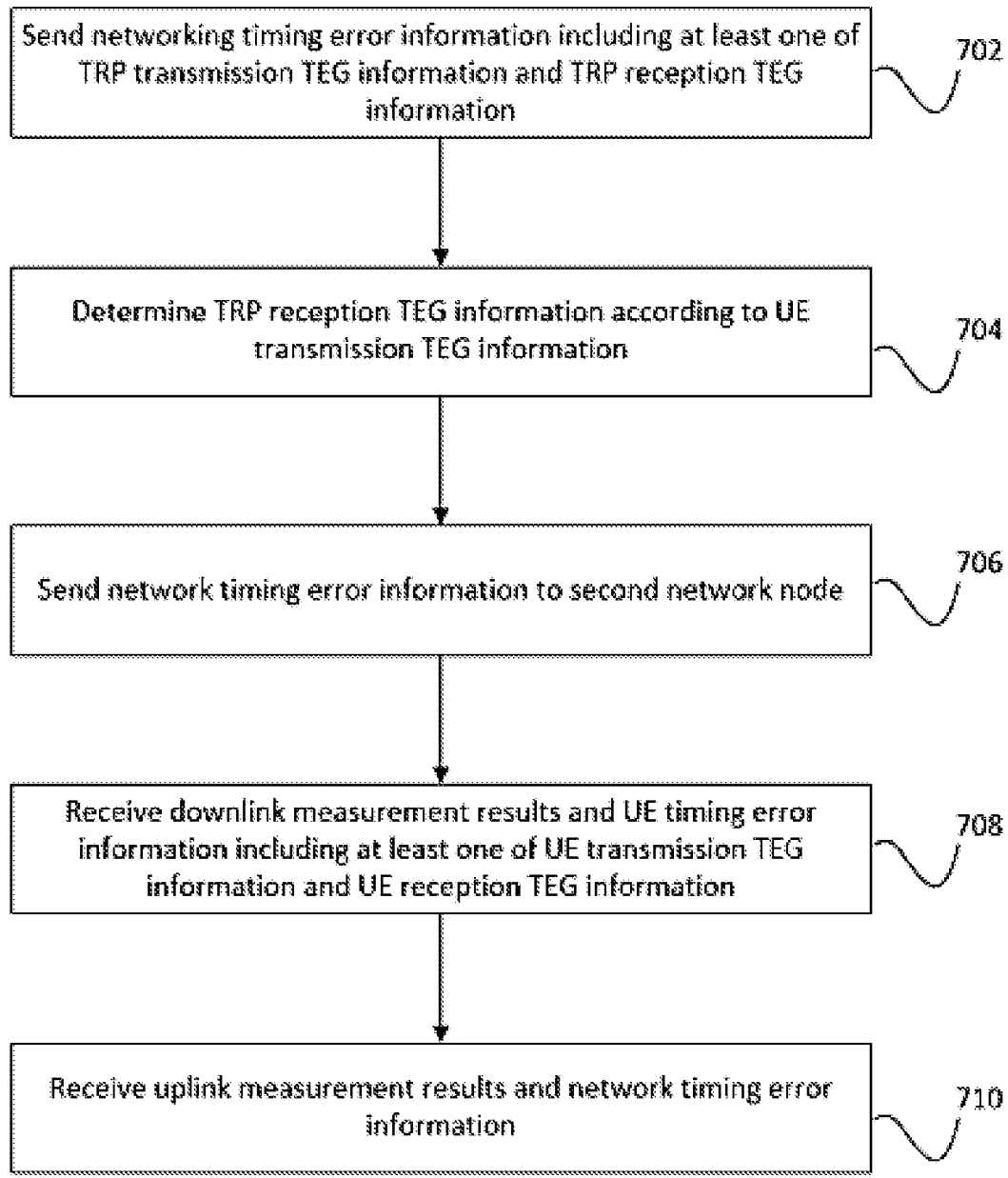

Send networking timing error information including at least one of TRP transmission TEG information and TRP reception TEG information — 702

Determine TRP reception TEG information according to UE transmission TEG information — 704

Send network timing error information to second network node — 706

Receive downlink measurement results and UE timing error information including at least one of UE transmission TEG information and UE reception TEG information — 708

Receive uplink measurement results and network timing error information — 710

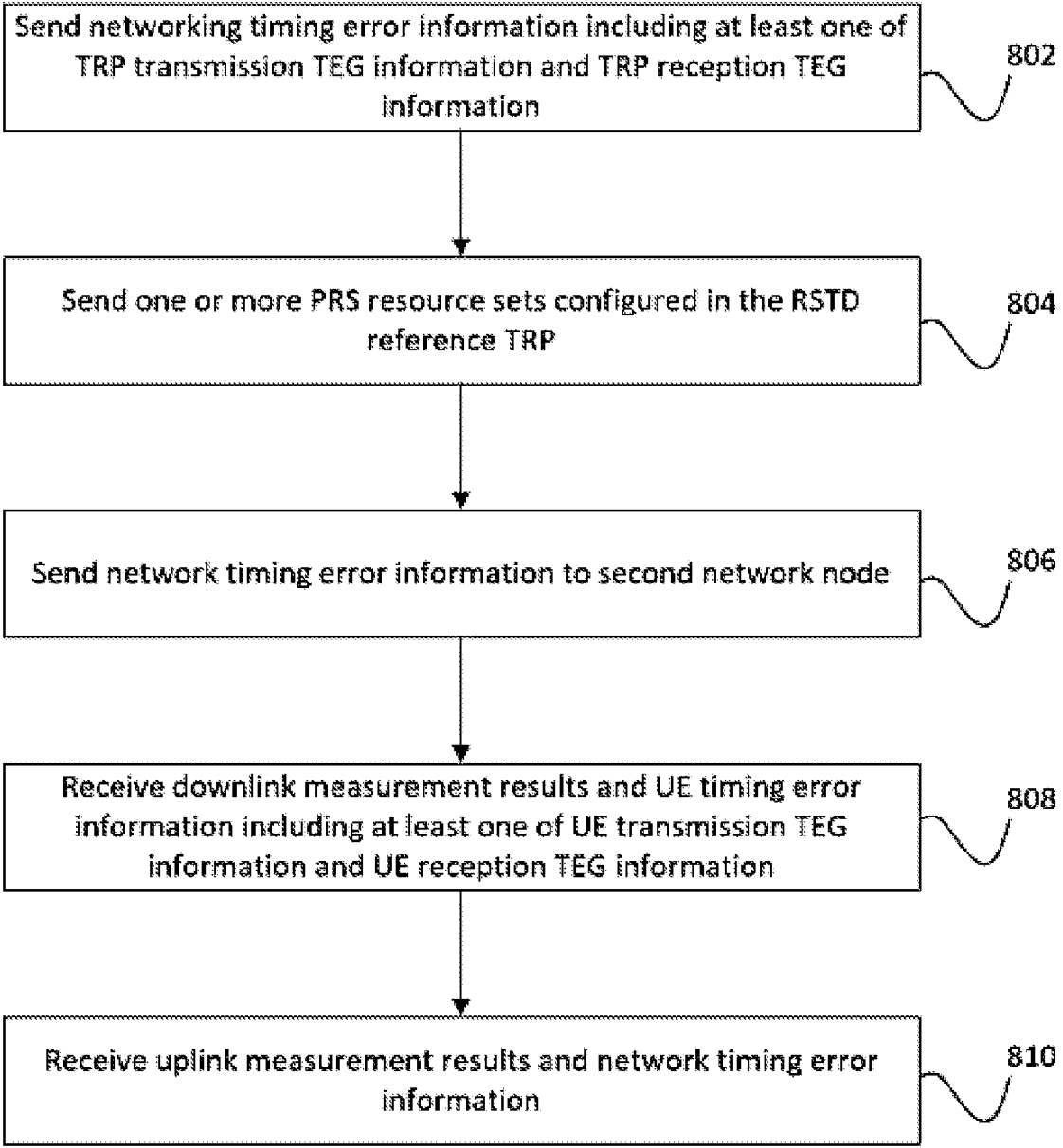

Send networking timing error information including at least one of TRP transmission TEG information and TRP reception TEG information ⟩ 802

Send one or more PRS resource sets configured in the RSTD reference TRP ⟩ 804

Send network timing error information to second network node ⟩ 806

Receive downlink measurement results and UE timing error information including at least one of UE transmission TEG information and UE reception TEG information ⟩ 808

Receive uplink measurement results and network timing error information ⟩ 810

FIG. 8

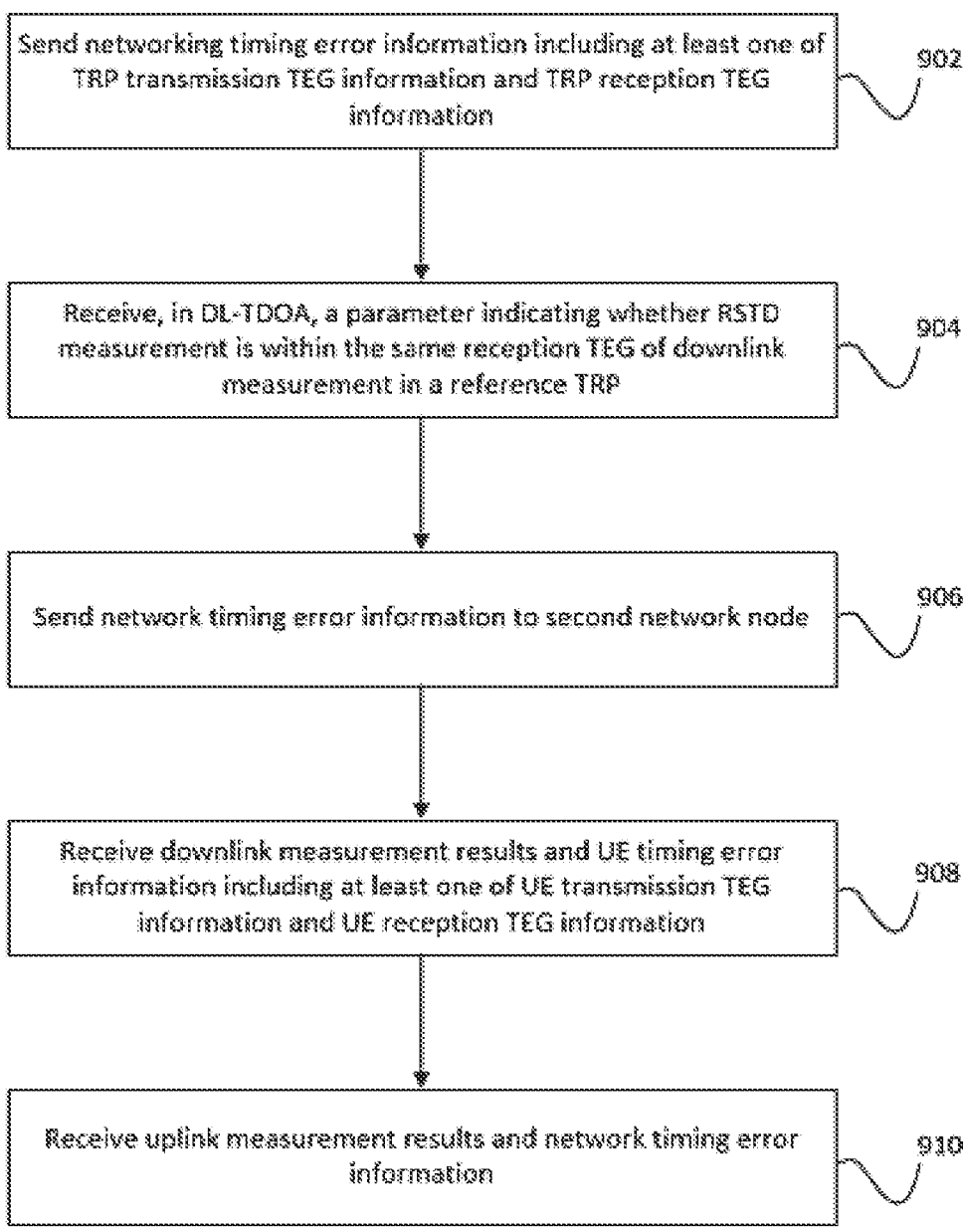

900

Send networking timing error information including at least one of TRP transmission TEG information and TRP reception TEG information ⟶ 902

Receive, in DL-TDOA, a parameter indicating whether RSTD measurement is within the same reception TEG of downlink measurement in a reference TRP ⟶ 904

Send network timing error information to second network node ⟶ 906

Receive downlink measurement results and UE timing error information including at least one of UE transmission TEG information and UE reception TEG information ⟶ 908

Receive uplink measurement results and network timing error information ⟶ 910

FIG. 9

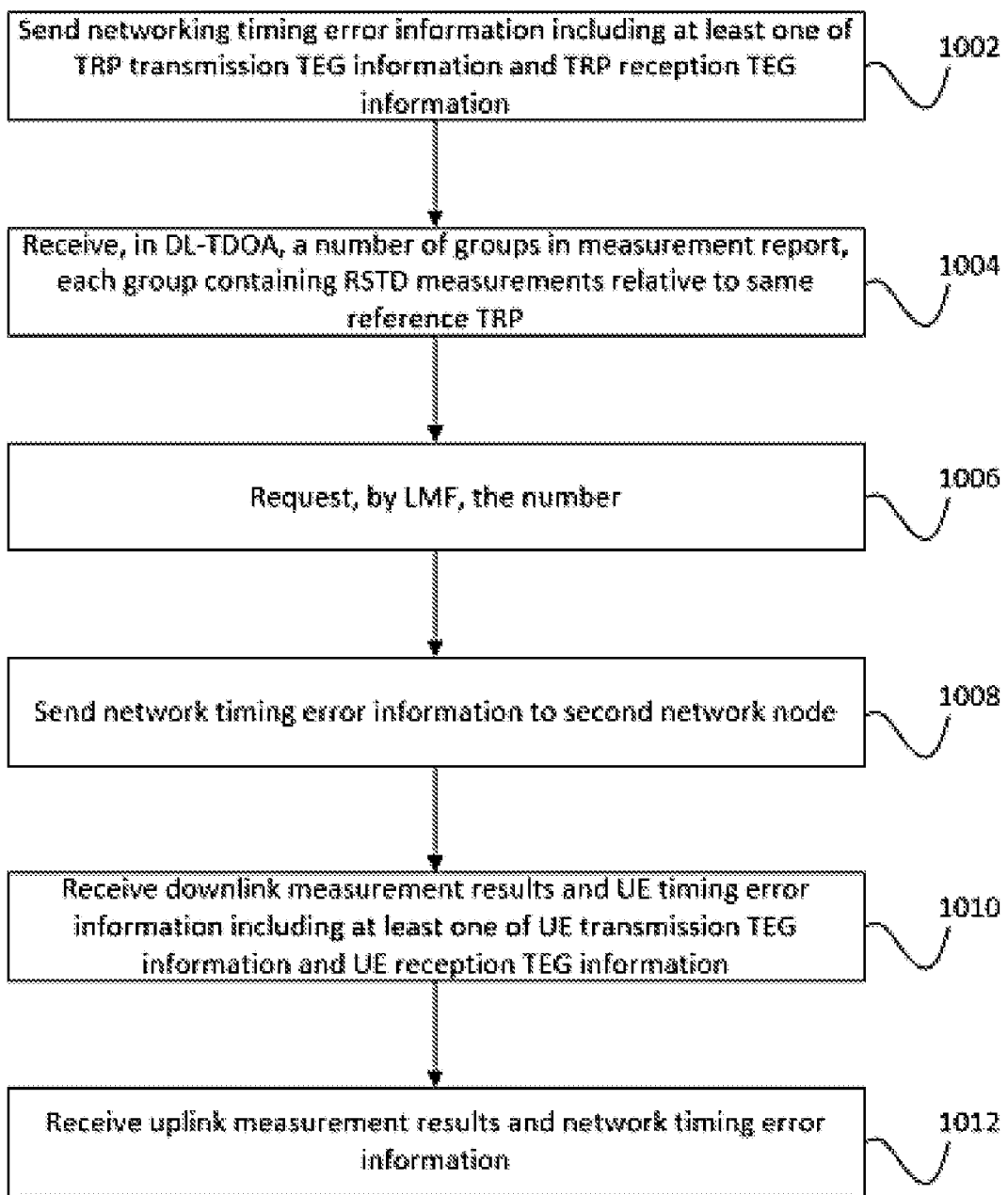

1000

Send networking timing error information including at least one of TRP transmission TEG information and TRP reception TEG information — 1002

Receive, in DL-TDOA, a number of groups in measurement report, each group containing RSTD measurements relative to same reference TRP — 1004

Request, by LMF, the number — 1006

Send network timing error information to second network node — 1008

Receive downlink measurement results and UE timing error information including at least one of UE transmission TEG information and UE reception TEG information — 1010

Receive uplink measurement results and network timing error information — 1012

SYSTEMS AND METHODS FOR INDICATING POSITIONING INFORMATION IN WIRELESS COMMUNICATION SYSTEMS

CROSS-REFERENCE TO RELATED APPLICATION

This application claims the benefit of priority under 35 U.S.C. § 120 as a continuation of PCT Patent Application No. PCT/CN2021/085295, filed on Apr. 2, 2021, the disclosure of which is incorporated herein by reference in its entirety.

TECHNICAL FIELD

The disclosure relates generally to wireless communication, including but not limited to systems and methods for obtaining positioning information in wireless communication systems.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One embodiment of the invention relates to a wireless communication method, including: receiving, by a wireless communication device from a network, network timing error information, and reporting, by the wireless communication device to the network, downlink measurement results and UE timing error information. The network timing error information includes at least one of Transmission and Reception Point (TRP) transmission Timing Error Group (TEG) information and TRP reception TEG information. The UE timing error information includes at least one of UE transmission TEG information and UE reception TEG information.

In some embodiments, the method can further include determining, by the wireless communication device, the UE reception TEG information according to the TRP transmission TEG information.

In some embodiments, the TRP transmission TEG information includes at least one of TRP transmission TEG identifier (ID), first Positioning Reference Signal (PRS) resource ID, or first PRS resource set ID. In some embodiments, the TRP reception TEG information includes at least one of TRP reception TEG ID, first Sounding Reference Signal (SRS) resource ID, or first SRS resource set ID. In some embodiments, the UE transmission TEG information includes at least one of UE transmission TEG ID, second SRS resource ID, or second SRS resource set ID. In some embodiments, the UE reception TEG information includes at least one of UE reception TEG ID, second PRS Resource ID, or second PRS resource set ID.

In some embodiments, the above method further includes determining, by the wireless communication device, downlink measurement associated with the UE reception TEG information having a same ID as the TRP transmission TEG information. The downlink measurement is derived from downlink resources associated with the TRP transmission TEG information.

In some embodiments, the above method further includes determining, by the wireless communication device, downlink measurement associated with the UE reception TEG information having an ID different from an ID of the TRP transmission TEG information. The downlink measurement is derived from the downlink resources associated with the TRP transmission TEG information.

In some embodiments, in Downlink Time Difference of Arrival (DL-TDOA), at least one of the PRS Resource ID or at least one of the PRS resource set ID indicates a PRS or a PRS resource set configured in one or more Reference Signal Time Difference (RSTD) reference TRPs.

In some embodiments, the above method further includes: receiving, by the wireless communication device from the network, one or more PRS resource sets configured in the RSTD reference TRP.

In some embodiments, reporting the downlink measurement results includes in DL-TDOA, reporting, by the wireless communication device to the network, a parameter indicating whether RSTD measurement is within a same reception TEG of downlink measurement in a RSTD reference TRP.

In some embodiments, reporting the downlink measurement results includes in DL-TDOA, reporting, by the wireless communication device to the network, one or more reference timing in a measurement report. A reference timing is derived from at least one of: a TRP, a frequency layer in a TRP, a PRS resource set in a TRP, a PRS resource in a TRP.

In some embodiments, reporting the downlink measurement results includes in DL-TDOA, reporting, by the wireless communication device to the network, a number of groups in a measurement report. Each group contains RSTD measurements relative to at least one of: a same RSTD reference TRP, a same PRS resource in a RSTD reference TRP, a same PRS resource set in a RSTD reference TRP.

In some embodiments, the number equals to a number of UE the reception TEG information.

In some embodiments, the number is requested by a Location Management Function (LMF) of the network.

In some embodiments, if the SRS is configured to be Quasi-Co-Located (QCLed) with Synchronization Signal Blocks (SSBs), the SSBs are associated with geographical coordinate.

Another embodiment relates to a wireless communication apparatus including at least one processor and a memory. The at least one processor is configured to read code from the memory and implement the above method.

Another embodiment relates to a computer program product including a computer-readable program medium code stored thereupon, the code, when executed by at least one processor, causing the at least one processor to implement the above method.

Another embodiment includes a wireless communication method, including: sending, by a first network node to a wireless communication device, network timing error information, sending, by the first network node to a second network node, network timing error information, and receiving, by the second network node from the wireless communication device, downlink measurement results and UE timing error information. The method also includes receiving, by the second network node from the first network node, uplink measurement results and network timing error information. The network timing error information includes at least one of TRP transmission TEG information and TRP reception TEG information. The UE timing error information includes at least one of UE transmission TEG information and UE reception TEG information.

In some embodiments, the TRP transmission TEG information includes at least one of TRP transmission TEG ID, first PRS resource ID, or first PRS resource set ID. The TRP reception TEG information includes at least one of TRP reception TEG ID, first SRS resource ID, first SRS resource set ID, or the SRS resource receiving geographical coordinates. The UE transmission TEG information includes at least one of UE transmission TEG ID, second SRS resource ID, or second SRS resource set ID. And the UE reception TEG information includes at least one of UE reception TEG ID, second PRS Resource ID, or second PRS resource set ID.

In some embodiments, the above method further includes determining, by the first network node, the TRP reception TEG information according to the UE transmission TEG information.

In some embodiments, in DL-TDOA, at least one of the PRS Resource ID or at least one of the PRS resource set ID indicates a PRS or a PRS resource set configured in one or more RSTD reference TRPs.

In some embodiments, the above method further includes sending, by the first network node to the wireless communication device, one or more PRS resource sets configured in the RSTD reference TRP.

In some embodiments, the above method further includes: in DL-TDOA, receiving, by the first network node or the second network node from the wireless communication device, a parameter indicating whether RSTD measurement is within a same reception TEG of downlink measurement in a reference TRP.

In some embodiments, the above method further includes: in DL-TDOA, receiving, by the first network node or the second network node from the wireless communication device, one or more reference timing in a measurement report. A reference timing is derived from at least one of: a TRP, a frequency layer in a TRP, a PRS resource set in a TRP, a PRS resource in a TRP.

In some embodiments, the above method further includes: in DL-TDOA, receiving, by the first network node or the second network node from the wireless communication device, a number of groups in a measurement report Each group contains RSTD measurements relative to at least one of: a same RSTD reference TRP, a same PRS resource in a RSTD reference TRP, a same PRS resource set in a RSTD reference TRP.

In some embodiments, the number equals to a number of the UE reception TEG information.

In some embodiments, the above method further includes requesting, by the second network node, the number. The second network node is Location Management Function (LMF).

In some embodiments, if the SRS is configured to be QCLed with SSBs, the SSBs are associated with geographical coordinate.

Another embodiment relates to a wireless communication apparatus including at least one processor and a memory The at least one processor is configured to read code from the memory and implement the above method.

Another embodiment relates to a computer program product including a computer-readable program medium code stored thereupon, the code, when executed by at least one processor, causing the at least one processor to implement the above method.

BRIEF DESCRIPTION OF THE DRAWINGS

FIGS. 4, 5, 6, 7, 8, 9, 10, 11, and 12 illustrate flow charts of example wireless communication processes in accordance with some embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Accurate and precise positioning of UE is important in 5G NR technology. There are several methods of determining the position of the UE, including timing-based positioning methods such as the downlink/uplink time difference of arrival (DL/UL-TDOA) method and the multi-round trip time (multi-RTT) method. However, in timing-based positioning methods, there are timing delays or timing errors between the baseband and antenna both at the transmission/reception point (TRP) and the UE. This causes issues in measurement results for timing-based positioning methods which require cancellation and/or re-measurements to obtain greater accuracy. There are timing error groups (TEGs) in which the measurements or signals have the same timing delays or timing errors. The present disclosure improves measuring and reporting timing errors and timing error groups for different positioning methods.

1. Mobile Communication Technology and Environment

Figure 1:
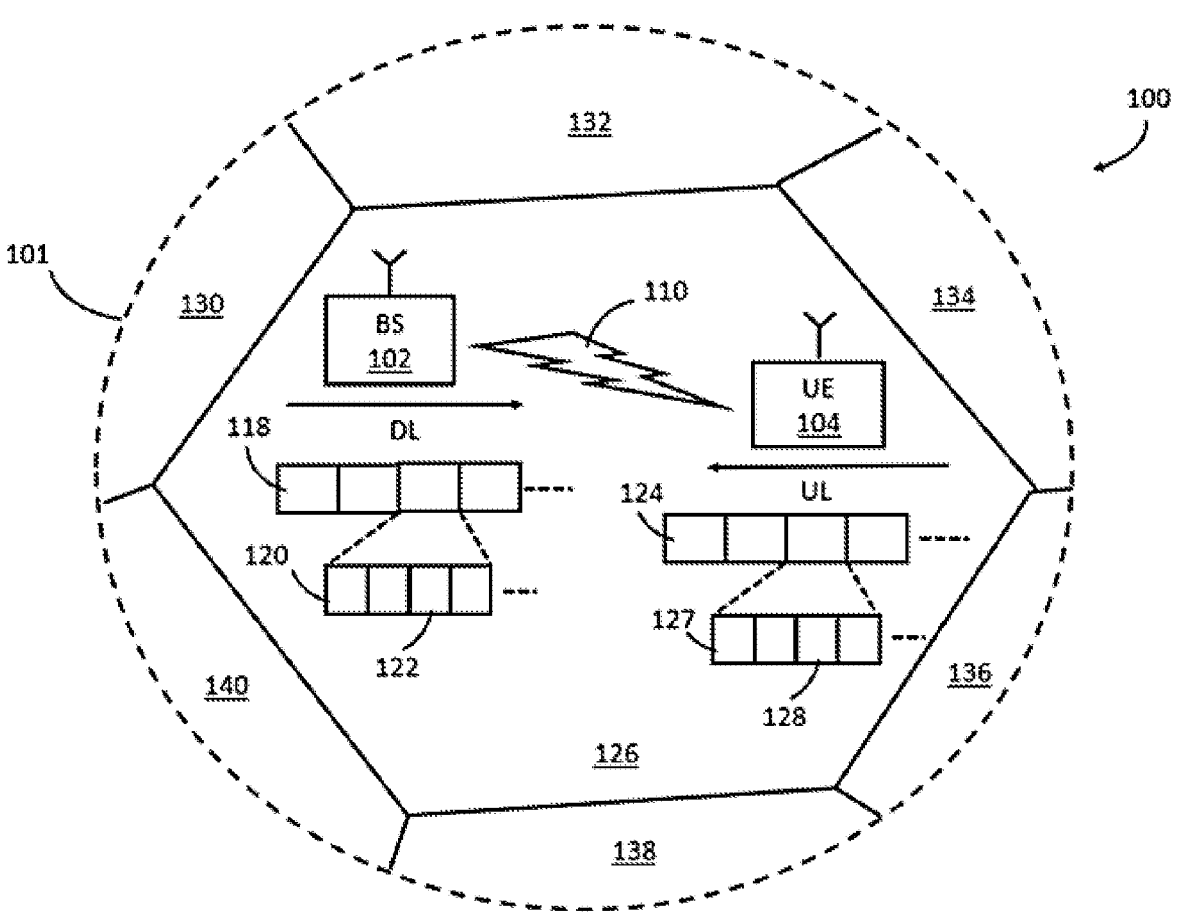
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a Location Management Function (LMF)). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
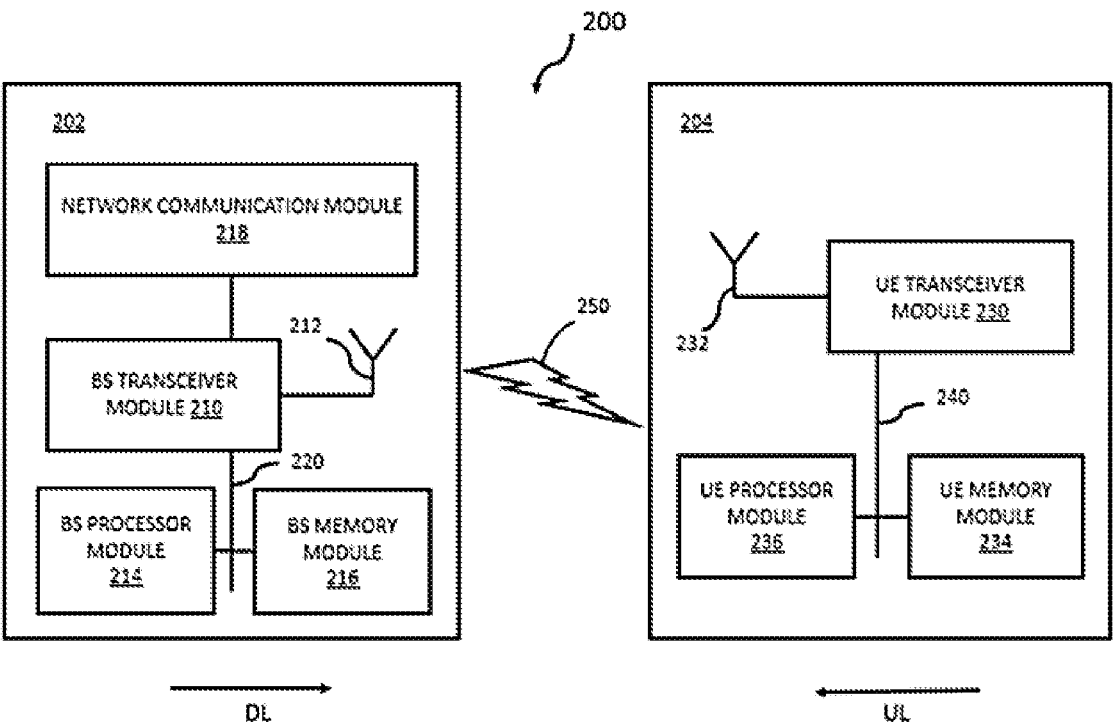
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.

FIG. 2 illustrates a block diagram of an example wireless communication system 200 for transmitting and receiving wireless communication signals (e.g., orthogonal frequency-division multiplexing (OFDM) or orthogonal frequency-division multiple access (OFDMA) signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Figure 3:
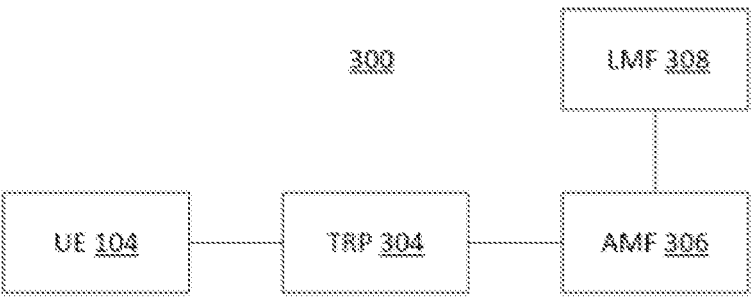
FIG. 3 illustrates a high-level schematic of a 5G core positioning architecture for NG-RAN in accordance with some embodiments of the present disclosure.

Referring to FIG. 3, a system 300 is shown, according to some embodiments. The UE 104 can be communicatively connected to a TRP 304. An example of the TRP 304 is the BS 102. An access and mobility management function (AMF) 306 receives requests and handles connection or mobility management. For example, the AMF 306 sends location service requests to a location management function (LMF) 308. The LMF 308 can process the location services request and returns a result of the location service back to the AMF 306. The AMF 306 can return the location service back to the TRP 304.

2. Methods for Indicating Positioning Information

Receiver (Rx) and transmitter (Tx) timing delays between baseband and RF chains are embedded in timing measurements, since the time is recorded at the baseband while the time duration measured for positioning (e.g., propagation time) is cut off at the antenna side for both in transmission/reception point (TRP) and UE. In the present disclosure, the timing delay can be called a timing error, transmission delay, transmission error, group delay or group error. The BS 102 can be the next generation NodeB (gNB) or the TRP.

A TEG is a group of UL/DL positioning signals or DL/UL measurements that have the same timing error or have timing errors within a certain margin. Tx TEG means the transmitting positioning signals in the group have the same Tx timing error or have timing errors within a certain margin. Rx TEG means the UL or DL measurements in the group have the same Rx timing error or have timing errors within a certain margin. A TRP may include multiple Tx TEGs and/or multiple Rx TEGs. A UE may have multiple Tx TEGs and/or multiple Rx TEGs. A TRP Tx TEG may have multiple PRS resources or PRS resource sets, and a UE Tx TEG may have multiple SRS resources or SRS resource sets.

For example, the TEG can be divided or grouped according to frequency layers, beams (e.g., spatial transmission filter), and/or panels (e.g., RF chain, antenna). For example, the PRS resources or PRS resource sets in a frequency layer, with the sending beam, on one of the panel are within one TRP Tx TEG. As another example, the PRS resources or PRS resource sets in another frequency layer, with the same sending beam, on the same panel may be within another TRP Tx TEG.

For example, the gNB can determine that the PRS resources or PRS resource sets in a single TRP with the same configured/indicated coordinates are within one TRP Tx TEG. The gNB can determine the UL measurements derived from SRS resources that are configured with the same PRS resources coordinates are within one TRP Rx TEG. Or the gNB can determine that the UL measurements derived from SRS resources that are configured with the same PRS resources are within one TRP Tx TEG.

For a UE, the DL measurements may include or belong to one or multiple measurement types, including relative signal time difference (RSTD) measurements, relative signal received power (RSRP) measurements or Rx-Tx time difference measurements. For a TRP, the UL measurements may include or belong to one or multiple measurement types, including relative time of arrival (RTOA) measurements, RSRP measurements or Rx-Tx time difference measurements.

A network can include at least one of the NG-RAN node and 5GC element. The NG-RAN node can be the TRP, gNB or RU, and the 5GC element can be the LMF, AMF, etc. A network node can be the TRP or the LMF.

The reference TRP mentioned in DL-TDOA can mean RSTD reference TRP, and the candidate TRP in DL-TDOA can mean neighbor TRP(s) around the reference TRP.

A. UE Reports Rx TEG Information with the DL Measurement

UE can report Rx TEG information with the DL measurement. The DL measurement may come from the DL-TDOA method, a downlink angle-of-departure (DL-AoD) and/or the multi-RTT method. For the DL-TDOA method, the Rx TEG information may include: Rx TEG identification (ID), PRS resource ID configured in the RSTD reference TRP, PRS resource set ID configured in the RSTD reference TRP or the coordinates of the PRS resources which are configured in the RSTD reference TRP. In the multi-RTT and DL-AoD methods, the Rx TEG information may include: Rx TEG ID, PRS resource ID, PRS resource set ID or PRS resource coordinates. The Rx TEG ID can be an index and an integer, and it can also be called the UE panel ID.

For example, in DL-TDOA, the UE can determine the UE Rx TEG of DL measurement of each reference TRP and each candidate TRP. The Rx TEG ID can be configured in each NR-DL-TDOA-MeasElement information element (IE) or in each NR-DL-TDOA-AdditionalMeasurementElement IE. If DL measurements of PRS resource(s) from the reference TRP is associated with the UE Rx TEG ID=1, the UE can report a UE Rx TEG ID=2 of RSTD measurement in one of the measurement elements to indicate the DL measurement of PRS resource from the candidate TRP is associated with the UE Rx TEG2. When an LMF (e.g., the LMF 308) receives this RSTD measurement with the UE Rx TEG ID, then the LMF track or record that this RSTD measurement result includes the UE Rx timing error that is not mitigated. A measurement element is a IE defined in NR-DL-TDOA-SignalMeasurementInformation in 37.355.

For another example, in DL-TDOA, the UE can report a PRS resource ID/PRS resource set ID configured in the reference TRP with the RSTD measurement in each measurement element or in each additional measurement element. This indicates that the RSTD measurement in the measurement element or in the additional measurement element are calculated relative to this PRS resource ID/PRS resource set ID of the reference TRP.

For example, in DL-TDOA or multi-RTT, the UE Rx TEG ID can be configured in the PRS resource or PRS resource set.

For another example, in multi-RTT, the UE can report a UE Rx TEG ID of each Rx-Tx time difference measurement in each measurement element or in each additional measurement element.

For another example, in DL-AoD, the UE can report a UE Rx TEG ID of each RSRP measurement in each measurement element or in each additional measurement element.

B. LMF Provides Assistance Data with TRP Tx TEG Information to UE

The LMF can provide assistance data with TRP Tx TEG information to the UE for UE-based positioning and UE-assist positioning. The TRP Tx TEG information can be a Tx TEG ID, which can be configured per PRS resource, or per PRS resource set, or per TRP. The TRP Tx TEG ID may indicate that the associated PRS resource is sent from which panel/RF chain of the TRP. Therefore, the TRP Tx TEG ID can also be the TRP/gNB panel ID. If the PRS resource coordinates are configured and/or indicated, the PRS resource configuration may indicate the TRP Tx panel information implicitly according to different coordinates. PRSs with different coordinates may belong to different TRP panels.

For example, in DL-TDOA, the several DL PRS resources configured in a reference TRP can be associated with a TRP Tx TEG ID, or, one reference TRP may include multiple DL PRS resource sets. In this example, each set can be associated with a TRP Tx TEG ID, several PRS resource sets can be associated with a TRP Tx TEG ID, or a TRP Tx TEG ID can be configured with a reference TRP.

Alternatively, the LMF or TRP provides TRP Rx TEG information to the UE for UE-based positioning.

C. UE/TRP Determines the UE/TRP Rx TEG Information According to the TRP/UE Tx TEG Information In the DL-TDOA, multi-RTT and DL-AoD methods, UE can determine the UE Rx TEG information according to the TRP Tx TEG information. If the TRP Tx TEG ID is configured and/or associated with a PRS resource, a PRS resource set or a TRP, when the UE receives this information, then the UE can determine that the DL measurement derived from this PRS resource, PRS resource set or this TRP is associated with the UE Rx TEG that has the same ID/index as the TRP Tx TEG. For example, in multi-RTT, the UE can receive a PRS1 configuration with Tx TEG ID=1 from TRP1 in assistance data. So the UE can determine that the Rx-Tx time difference measurement derived from PRS1 should be within the UE Rx TEG1. Or the UE can determine that the DL measurement derived from this PRS resource, PRS resource set or this TRP is associated with the UE Rx TEG that has a different ID/index than the TRP Tx TEG.

In the UL-TDOA, multi-RTT and uplink angle-of-arrival (UL-AoA) methods, the TRP can determine the TRP Rx TEG information according to the UE Tx TEG information. If the UE Tx TEG ID is associated with one or more SRS resources or SRS resource sets, and the TRP knows this information based on the UE reporting or LMF requesting/scheduling, the TRP can determine that the UL measurements derived from the SRS resources associated with this UE Tx TEG ID belongs to a specific TRP Rx TEG. The TRP Rx TEG ID can be the same as the UE Tx TEG ID or different from the UE Tx TEG ID.

D. LMF Sends Measurement UE Tx TEG Information to the TRPs

If TRPs need to provide positioning measurements to the LMF, LMF will send a measurement request message to the TRPs to provide the SRS configuration and measurement beam information request. The TRP can schedule the UE to send positioning SRSs with the configured spatial relationship information (e.g., spatialRelationInfo) to the TRPs. For the multi-RTT, UL-AoD and/or UL-TDOA methods, the LMF can send/request the SRS configuration information with the UE Tx TEG information to the TRP. The TRP can schedule the UE to send the SRS according to the SRS configuration with UE Tx TEG information. The UE Tx TEG information can be the UE Tx TEG ID, which can be configured per SRS resource or SRS resource set. For example, the UE Tx TEG ID can be configured per SRS resource in the SRS configuration IE or the positioning SRS resource IE in NRPPa. Then, the TRP can report the UL measurements to the LMF with UE Tx TEG information, SRS resource ID or SRS resource set ID.

E. In DL-TDOA, Adding the Number of Reference TRPs

In DL-TDOA, the number of reference TRPs can be added. The number of reference TRPs is determined according to the number of UE Rx TEGs. The UE can determine RSTD measurements relative to different reference TRPs belonging to the different UE Rx TEGs. The UE can choose to use N different reference RSTD TRPs, where N is the number of UE Rx TEGs. The UE can report N reference RSTD TRPs when reporting measurement results. The RSTD measurements in each measurement element in the measurement report can be calculated between the candidate TRPs and the reference TRPs. The DL measurements of the candidate TRPs and the reference TRPs belong to the same Rx TEGs.

For example, the DL-PRS-ID-Info IE can include 2 dl-PRS-ID, namely dl-PRS-ID and dl-PRS-second-ID, indicating that there are 2 reference TRPs. In the TDOA report IE NR-DL-TDOA-SignalMeasurementInformation, if NR-DL-TDOA-MeasElement includes the dl-PRS-ID, it can mean the RSTD measurements are provided relative to the first RSTD reference TRP. If NR-DL-TDOA-MeasElement contains the dl-PRS-second-ID, it can mean the RSTD measurements are provided relative to the second RSTD reference TRP.

For another example, the UE can be configured with 2 DL-PRS-ID-Info, namely DL-PRS-ID-Info and DL-PRS-second-ID-Info. When reporting measurement results, the UE can include 2 dl-PRS-ReferenceInfo in the NR-DL-TDOA-SignalMeasurementInformation, namely dl-PRS-ReferenceInfo and dl-PRS-second-ReferenceInfo. There can be one-to-one mapping with the 2 DL-PRS-ID-Info. If NR-DL-TDOA-MeasElement includes the dl-PRS-ReferenceInfo, it can mean the RSTD measurements are provided relative to the first RSTD reference TRP. If NR-DL-TDOA-MeasElement includes the dl-PRS-second-ReferenceInfo, it can mean the RSTD measurements are provided relative to the second RSTD reference TRP.

In DL-TDOA, the disclosed technology can include multiple reference timing. The UE reports one or more reference timing in a measurement report, where a reference timing is derived from at least one of a TRP, a frequency layer in a TRP, a PRS resource set in a TRP, a PRS resource in a TRP. The UE can determine multiple reference timing for calculating RSTD measurement. The multiple reference timing can be derived from different TRPs, different frequency layers in a TRP, different PRS resources in a TRP, or different PRS resource set in a TRP. For example, PRS1 and PRS2 are sent from TRP1, and PRS3 and PRS4 are sent from TRP2. The PRS1 can be chosen as the reference timing, and the UE can calculate RSTD measurement between TRP2 and TRP1 to be [the start subframe of receiving PRS3 or PRS4]–[the start subframe of receiving PRS1]. The PRS3 (or PRS4) and PRS1 can be within the same UE Rx TEG so the RSTD measurement will have no Rx timing error.

In reporting, UE can report the reference timing. The UE can report the TRP ID, PRS resource set ID or PRS resource ID as the reference ID for each RSTD measurement. For example, if 2 PRS resources are chosen to be the reference timing, UE reports PRS resource ID with each RSTD measurement to indicate the RSTD measurement is relative to which PRS resource, i.e., to which reference timing. The UE can also report the reference timing ID to indicate the RSTD is derived from which reference timing. The UE can also report the reference timing ID with the reference TRP and with the neighbor TRP. The number of reported reference timing can be M, where M equals the number of UE Rx TEGs. M can also be requested/indicated by the LMF.

F. UE Reports Parameter to Indicate Whether RSTD Measurement is within Same Rx TEG In DL-TDOA reporting, the UE can report a parameter to indicate whether RSTD measurement, derived from each candidate TRP and reference TRP pair, is within the same Rx TEG as the DL measurement in the reference TRP. In other words, UE can report a parameter to indicate whether the DL measurement derived from the candidate TRPs is within the same Rx TEG with the DL measurement in the reference TRP.

For example, the UE reports a parameter whose value is 0 or 1 to indicate whether each RSTD measurement is within the same Rx TEG as the DL measurement in the reference TRP. The parameter can be configured in each measurement element in a measurement report. If the value is 0, it can mean the DL measurement of PRS1 from the candidate TRP is not within the same UE Rx TEG as the DL measurement of PRS2 from the reference TRP, and vice versa.

Alternatively, In DL-TDOA reporting, the UE can report N groups in the measurement report, where N equals the number of UE Rx TEGs. N can also be requested/indicated by the LMF. Each group can include several measurement elements. The RSTD measurements in these measurement elements within the same group are provided by one of the following:

1. Provided relative to the same RSTD reference TRP. Different group may relate to different reference TRPs.
2. Provided relative to the same PRS resource(s) or the same PRS resource set(s) configured in the RSTD reference TRP. Different group may relate to different PRS resource(s) or PRS resource set(s).

In each group, UE use the same panel to receive the PRS resources from the neighbor TRP and reference TRP, that is to say, the RSTD measurements in a group is within the same Rx TEG.

G. The UE can Report UE Tx TEG Information with the DL Measurement Results to the LMF.

In the multi-RTT method, the UE can report UE Tx TEG information with the DL measurement results to the LMF. The UE Tx TEG information can be UE Tx TEG ID, SRS resource ID and/or SRS resource set ID. For example in multi-RTT method, UE may report:

1. The SRS resource ID or SRS resource set ID relative to the Rx-Tx time difference measurement in a measurement element.
2. A Tx TEG ID along with the Rx-Tx time difference measurement to indicate the SRS relative to this Rx-Tx time difference measurement is within which Tx TEG.
3. The Tx TEG ID and SRS resource ID with the Rx-Tx time difference measurement to the LMF. The configuration could be: UE reports one or more SRS resources, each of which is associated with a Tx TEG ID. Or the UE reports several Tx TEG ID, each Tx TEG ID is associated with one or more SRS resources or SRS resource sets. The SRS resources or SRS resource sets mentioned above can be for positioning use or for multiple input multiple output (MIMO) use.

For example, if the LMF wants to combine the method, such as DL-TDOA with UL-TDOA or differential multi-RTT, the SRSs that the UE sends to different TRPs should be within one Tx TEG. The SRS resources or SRS resource sets mentioned above can be for positioning use or for MIMO use.

H. The SRS is QCLed to the PRS Resources or SSBs.

In 3GPP's Release 16 (R16), the positioning SRS can be QCLed to PRS resources or SSBs. There are 4 options to perform:

1. The SRS is configured to be QCLed with PRS s associated with the PRS coordinate. This is already supported in R16 NRPPa.
2. If the SRS is configured to be QCLed with SSBs, each SSB can associate with a coordinate to indicate the geographical coordinates of the antenna reference points (ARPs) for the SSB s of a TRP. The coordinate can be geographical coordinate or a relative coordinate.
3. If the SRS is configured to be QCLed with SSBs, the TRP can report an UL-RTOA measurement, an UL-RSRP measurement or gNB Rx-Tx time difference measurement along with the TRP Rx TEG information to the LMF. The TRP Rx TEG information may include TRP Rx TEG ID or the SRS receive geographical coordinates.
4. If the SRS is not configured with the spatial relation, the TRP can report the UL-RTOA measurement, the uplink received signal received power (UL-RSRP) measurement or the gNB Rx-Tx time difference measurement along with the TRP Rx TEG information to the LMF. The TRP Rx TEG information may include the TRP Rx TEG ID or the SRS receive geographical coordinates.

The condition 1 and 2 is to ensure that the coordinate of ARP receiving the SRS and ARP sending PRS/SSB is the same. Then, in multi-RTT, UL-TDOA and/or UL-AoD method, UE will transmits SRS to the coordinate where TRP sends the PRS or SSB.

In some embodiments, the UE receives the TRP Tx TEG information from the LMF. The UE reports at least one of the following with the DL measurement results to the LMF: UE Tx TEG information or UE Rx TEG information.

In some embodiments, the TRP Tx TEG information includes at least one of TRP Tx TEG ID, PRS resource ID, or PRS resource set ID.

In some embodiments, the UE Tx TEG information includes at least one of UE Tx TEG ID, SRS resource ID, or SRS resource set ID.

In some embodiments, the UE Rx TEG information includes at least one of UE Rx TEG ID, PRS resource ID, or PRS resource set ID.

In some embodiments, the UE determines Rx TEG information according to the TRP Tx information.

In embodiments, the UE Rx TEG information includes at least one of UE Rx TEG ID, PRS resource ID, PRS resource set ID. For example, in DL-TDOA, the PRS resource ID or PRS resource set ID comes from (indicates the PRS or PRS resource set configured in the RSTD reference TRP) the RSTD reference TRP.

In some embodiments, the UE receives one or more PRS resource sets configured in the RSTD reference TRP.

In some embodiments, the UE reports Rx TEG information. For example, in DL-TDOA, the UE reports a parameter to indicate whether DL measurement(s) from each of the candidate TRPs is within the same Rx TEG as the DL measurement in the reference TRP. As another example, in DL-TDOA, the UE reports N groups in the measurement report, where N equals the number of UE Rx TEGs.

In some embodiments, if the SRS is configured to be QCLed with SSB s, each SSB is associated with a coordinate.

In some embodiments, the TRP reports TRP Rx TEG information to the LMF, and the TRP Rx TEG information includes at least one of the TRP Rx TEG ID or the SRS receive geographical coordinates.

FIG. 4 illustrates a flow chart of an example wireless communication process 400, according to some embodiments. The process 400 is performed by the UE. The process 400 can include the wireless communication device receiving network timing error information from the network (402) and determining a UE reception TEG information according to the TRP transmission TEG information (404). The process 400 can also include wireless communication device determining downlink measurement associated with the UE reception TEG information having a same ID as the TRP transmission TEG information, where the downlink measurement is derived from downlink resources associated with the TRP transmission TEG information (406). The process 400 can include the wireless communication device reporting downlink measurement results and UE timing error information to the network (408). The network timing error information can include at least one of TRP transmission TEG information and TRP reception TEG information. The UE timing error information can include at least one of UE transmission TEG information and UE reception TEG information.

FIG. 5 illustrates a flow chart of an example wireless communication process 500, according to some embodiments. The process 500 is performed by the UE. The process 500 can include the wireless communication device receiving network timing error information from the network (502) and determining a UE reception TEG information according to the TRP transmission TEG information (504). The process 500 can also include the wireless communication device determining downlink measurement associated with the UE reception TEG information having a different ID as the TRP transmission TEG information, where the downlink measurement is derived from downlink resources associated with the TRP transmission TEG information (506). The process 500 can include the wireless communication device reporting downlink measurement results and UE timing error information to the network (508). The network timing error information can include at least one of TRP transmission TEG information and TRP reception TEG information. The UE timing error information can include at least one of UE transmission TEG information and UE reception TEG information.

Figure 6:
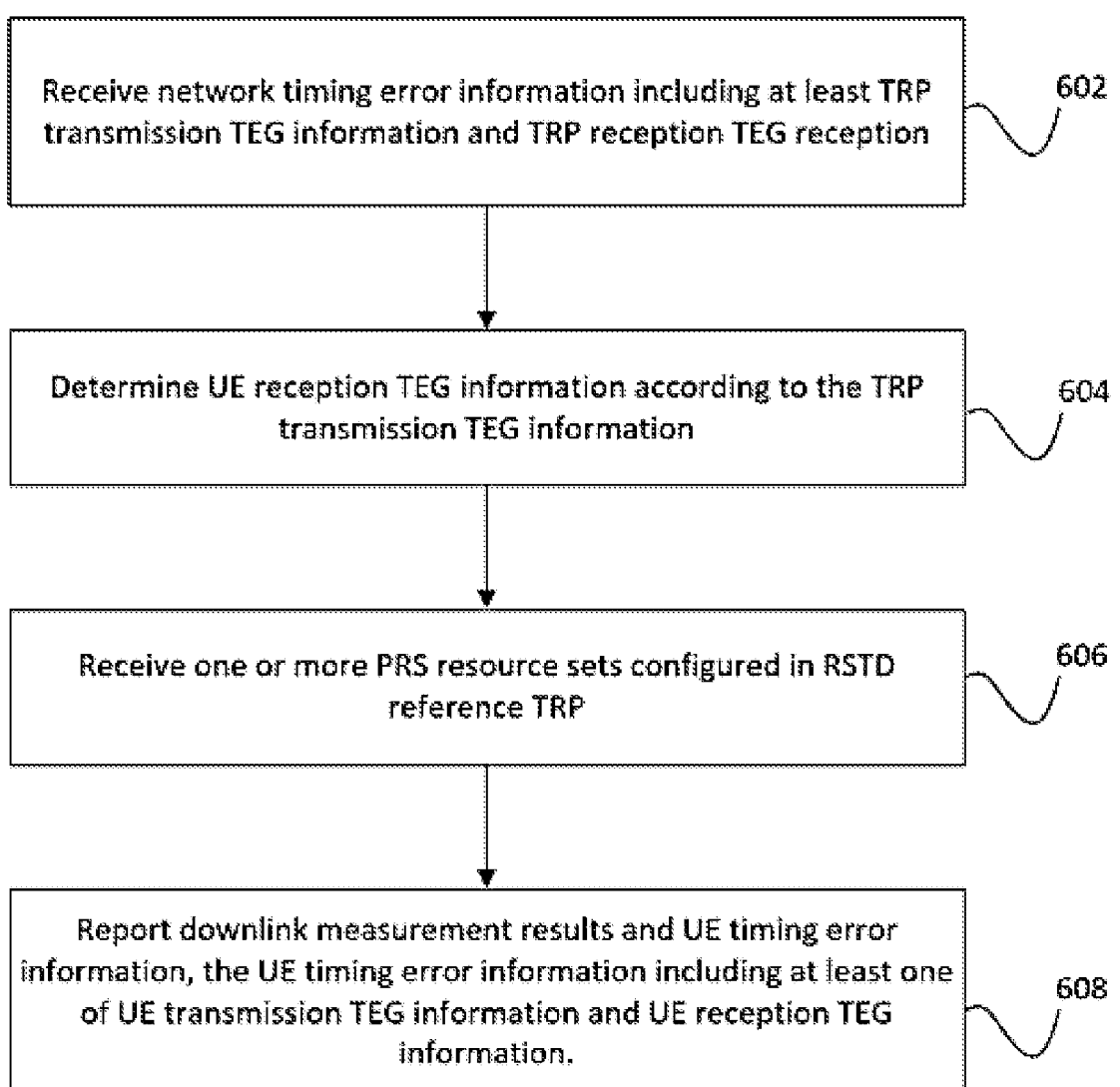

FIG. 6 illustrates a flow chart of an example wireless communication process 600, according to some embodiments. The process 600 is performed by the UE. The process 600 can include the wireless communication device receiving network timing error information from the network (602) and the wireless communication device determining a UE reception TEG information according to the TRP transmission TEG information (604). The process 600 can also include the wireless communication device receiving one or more PRS resource sets configured in the RSTD reference TRP (606). The process 600 can include the wireless communication device reporting downlink measurement results and UE timing error information to the network (608). The network timing error information can include at least one of TRP transmission TEG information and TRP reception TEG information. The UE timing error information can include at least one of UE transmission TEG information and UE reception TEG information.

FIG. 7 illustrates a flow chart of an example wireless communication process 700, according to some embodiments. The process 700 is performed by the TRP. The process 700 can include a first network node (e.g., TRP 304) sending network timing error information to a wireless communication device (e.g., UE 104) (702). The process 700 can include the first network node determining the TRP reception TEG information according to the UE transmission TEG information (704). The process 700 can include the first network node sending network timing error information to a second network node (e.g., LMF 308) (706) and the second network node receiving from the wireless communication device downlink measurement results and UE timing error information (708). The process 700 can include the second network node receiving from the first network node uplink measurement results and network timing error information The network timing error information includes at least one of TRP transmission TEG information and TRP reception TEG information, and the UE timing error information includes at least one of UE transmission TEG information and UE reception TEG information (710).

FIG. 8 illustrates a flow chart of an example wireless communication process 800, according to some embodiments. The process 800 is performed by the TRP. The process 800 can include a first network node (e.g., TRP 304) sending network timing error information to a wireless communication device (e.g., UE 104) (802). The process 800 can include the first network node sending one or more PRS resource sets configured in the RSTD reference TRP to the wireless communication device (804). The process 800 can include the first network node sending network timing error information to a second network node (e.g., LMF 308) (806) and the second network node receiving from the wireless communication device downlink measurement results and UE timing error information (808). The process 800 can include the second network node receiving from the first network node uplink measurement results and network timing error information The network timing error information includes at least one of TRP transmission TEG information and TRP reception TEG information. The UE timing error information includes at least one of UE transmission TEG information and UE reception TEG information (810).

FIG. 9 illustrates a flow chart of an example wireless communication process 900, according to some embodiments. The process 900 is performed by the TRP. The process 900 can include a first network node (e.g., TRP 304) sending network timing error information to a wireless communication device (e.g., UE 104) (902). The process 900 can include the first network node or the second network node receiving, in DL-TDOA, a parameter indicating whether RSTD measurement is within a same reception TEG of downlink measurement in a reference TRP from a wireless network communication device (904). The process 900 can include the first network node sending network timing error information to a second network node (e.g., LMF 308) (906) and the second network node receiving from the wireless communication device downlink measurement results and UE timing error information (908). The process 900 can include the second network node receiving from the first network node uplink measurement results and network timing error information. The network timing error information includes at least one of TRP transmission TEG information and TRP reception TEG information. The UE timing error information includes at least one of UE transmission TEG information and UE reception TEG information (910).

FIG. 10 illustrates a flow chart of an example wireless communication process 1000, according to some embodiments. The process 1000 is performed by the TRP. The process 1000 can include a first network node (e.g., TRP 304) sending network timing error information to a wireless communication device (e.g., UE 104) (1002). The process 1000 can the first network node receiving, in DL-TDOA, a number of groups in a measurement report. Each group includes RSTD measurements relative to a same reference TRP (1004). The process 1000 can include the second network node (e.g., LMF 308) requesting the number (1006). The process 1000 can include the first network node sending network timing error information to a second network node (e.g., LMF 308) (1008) and the second network node receiving from the wireless communication device downlink measurement results and UE timing error information (1010). The process 1000 can include the second network node receiving from the first network node uplink measurement results and network timing error information. The network timing error information includes at least one of TRP transmission TEG information and TRP reception TEG information. The UE timing error information includes at least one of UE transmission TEG information and UE reception TEG information (1012).

Figure 11:
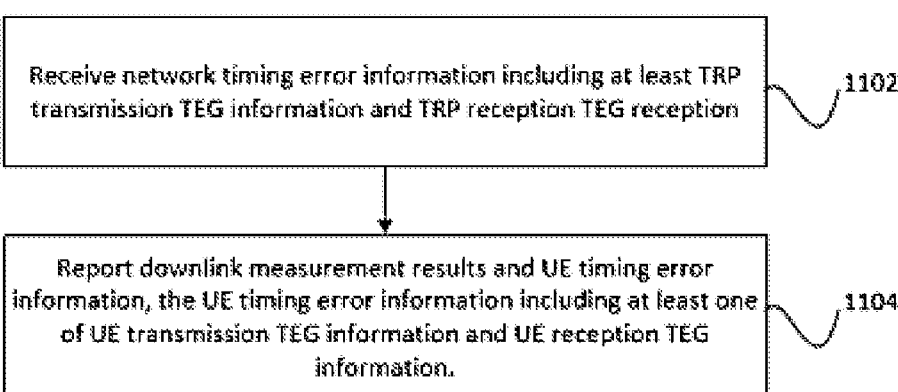

FIG. 11 illustrates a flow chart of an example wireless communication process 1100, according to some embodiments. The process 1100 is performed by the UE. The process 1100 can include the wireless communication device receiving network timing error information from the network (1102). The network timing error information can include at least one of TRP transmission TEG information and TRP reception TEG information. The process 1100 can also include wireless communication device reporting downlink measurement results and UE timing error information to the network (1104). The UE timing error information can include at least one of UE transmission TEG information and UE reception TEG information.

Figure 12:
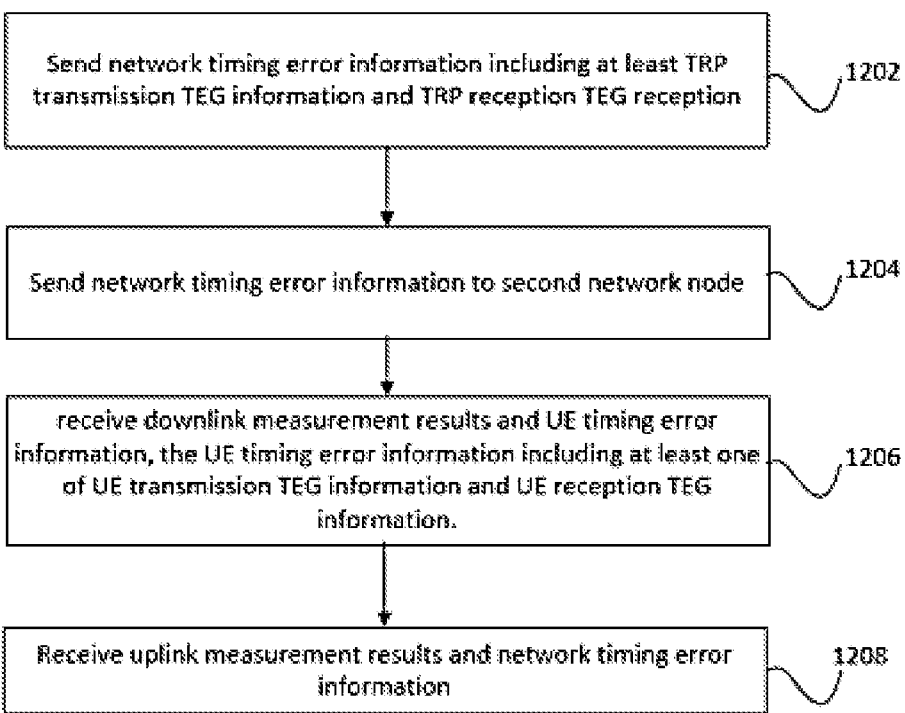

FIG. 12 illustrates a flow chart of an example wireless communication process 1200, according to some embodiments. The process 1200 is performed by the TRP. The process 1200 can include a first network node (e.g., TRP 304) sending network timing error information to a wireless communication device (e.g., UE 104) (1202). The network timing error information includes at least one of TRP transmission TEG information and TRP reception TEG information. The process 1200 can include the first network node sending network timing error information to a second network node (e.g., LMF 308) (1204). The second network node receives from the wireless communication device downlink measurement results and UE timing error information (1206). The UE timing error information includes at least one of UE transmission TEG information and UE reception TEG information. The process 1000 can include the second network node receiving from the first network node uplink measurement results and network timing error information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
receiving, by a wireless communication device from a network, Transmission and Reception Point (TRP) transmission Timing Error Group (TEG) information; and
reporting, by the wireless communication device to the network, downlink measurement results, one or more reference TRPs, and User Equipment (UE) reception TEG information, wherein the downlink measurement results are reported through a number of groups, and downlink measurement results in each of the group are determined relative to a respective one of the one or more reference TRPs and respective one of the one or more UE reception TEG information; and
reporting, by the wireless communication device to the network, whether downlink measurement results derived using the reference TRP and a candidate TRP pair belong to a same UE reception TEG as downlink measurement results of the reference TRP.

2. The wireless communication method of claim 1, wherein:
the TRP transmission TEG information comprises at least one of a TRP transmission TEG identifier (ID), a first Positioning Reference Signal (PRS) resource ID, or first PRS resource set ID;
and
the UE reception TEG information comprises a UE reception TEG ID, second PRS resource ID, or second PRS resource set ID.

3. The wireless communication method of claim 1, comprising determining, by the wireless communication device, the UE reception TEG information according to the TRP transmission TEG information.

4. The wireless communication method of claim 3, further comprising determining, by the wireless communication device, downlink measurement result associated with the UE reception TEG information having a same ID as the TRP transmission TEG information, wherein the downlink measurement results are derived from downlink reference signal resources associated with the TRP transmission TEG information.

5. A wireless communication device, comprising:

at least one processor configured to:

receive, via a transceiver from a network, Transmission and Reception Point (TRP) transmission Timing Error Group (TEG) information;

report, via the transceiver to the network, downlink measurement results, one or more reference TRPs, and User Equipment (UE) reception TEG information, wherein the downlink measurement results are reported through a number of groups, and downlink measurement results in each of the group are determined relative to a respective one of the one or more reference TRPs and respective one of the one or more UE reception TEG information; and report, via the transceiver to the network, whether downlink measurement results derived using the reference TRP and a candidate TRP pair belong to a same UE reception TEG as downlink measurement results of the reference TRP.

6. The wireless communication device of claim 5, wherein:

the TRP transmission TEG information comprises at least one of a TRP transmission TEG identifier (ID), a first Positioning Reference Signal (PRS) resource ID, or first PRS resource set ID;

and the UE reception TEG information comprises a UE reception TEG ID, second PRS resource ID, or second PRS resource set ID.

7. The wireless communication device of claim 5, wherein the at least one processor configured to determine the UE reception TEG information according to the TRP transmission TEG information.

8. The wireless communication device of claim 7, wherein the at least one processor configured to determine downlink measurement result associated with the UE reception TEG information having a same ID as the TRP transmission TEG information, wherein the downlink measurement results are derived from downlink reference signal resources associated with the TRP transmission TEG information.

9. A wireless communication method, comprising:

sending, by a network to a wireless communication device, Transmission and Reception Point (TRP) transmission Timing Error Group (TEG) information; and receiving, by the network from the wireless communication device, downlink measurement results, one or more reference TRPs, and User Equipment (UE) reception TEG information, wherein the downlink measurement results are reported through a number of groups, and downlink measurement results in each of the group are determined relative to a respective one of the one or more reference TRPs and respective one of the one or more UE reception TEG information; and receiving, by the network from the wireless communication device, whether downlink measurement results derived using the reference TRP and a candidate TRP pair belong to a same UE reception TEG as downlink measurement results of the reference TRP.

10. The wireless communication method of claim 9, wherein the TRP transmission TEG information comprises at least one of TRP transmission TEG identifier (ID), first Positioning Reference Signal (PRS) resource ID, or first PRS resource set ID; and the UE reception TEG information comprises a UE reception TEG ID, second PRS resource ID, or second PRS resource set ID.

11. The wireless communication method of claim 9, wherein the TRP reception TEG information comprises at least one of TRP reception TEG identifier (ID), first sounding reference signal (SRS) resource ID, or first SRS resource set ID;

the UE transmission TEG information comprises at least one of UE transmission TEG ID, second SRS Resource ID, or second SRS resource set ID.

12. A wireless communication apparatus, comprising:

at least one processor configured to:

send, via a transmitter to a wireless communication device, Transmission and Reception Point (TRP) transmission Timing Error Group (TEG) information;

receive, by the transmitter from the wireless communication device, downlink measurement results, one or more reference TRPs, and User Equipment (UE) reception TEG information, wherein the downlink measurement results are reported through a number of groups, and downlink measurement results in each of the group are determined relative to a respective one of the one or more reference TRPs and respective one of the one or more UE reception TEG information; and receiving, by the network from the wireless communication device, whether downlink measurement results derived using the reference TRP and a candidate TRP pair belong to a same UE reception TEG as downlink measurement results of the reference TRP.

13. The first network node of claim 12, wherein the TRP transmission TEG information comprises at least one of TRP transmission TEG identifier (ID), first Positioning Reference Signal (PRS) resource ID, or first PRS resource set ID; and the UE reception TEG information comprises a UE reception TEG ID, second PRS resource ID, or second PRS resource set ID.

14. The first network node of claim 12, wherein the TRP reception TEG information comprises at least one of TRP reception TEG identifier (ID), first sounding reference signal (SRS) resource ID, or first SRS resource set ID;

the UE transmission TEG information comprises at least one of UE transmission TEG ID, second SRS Resource ID, or second SRS resource set ID.

15. The method of claim 1, wherein the downlink measurement includes Reference Signal Time Difference (RSTD).

16. The method of claim 1, wherein the downlink measurement comprises a RSTD measurement which is a difference between a first PRS measurement of a first TRP and a second PRS measurement of a reference TRP, reporting, by the wireless communication device to the network, a parameter indicating whether the first PRS measurement is associated to a same reception TEG information as the second PRS measurement.

17. The method of claim 1, wherein the number of group is requested by a Location Management Function (LMF) of the network.

18. The method of claim 1, further comprising, reporting, by the UE to the network, UE transmission TEG information, wherein the UE transmission TEG information comprises at least one of UE transmission TEG ID, sounding reference signal (SRS) resource ID, or SRS resource set ID.

* * * * *